United States Patent
Wang

(10) Patent No.: US 12,401,908 B2
(45) Date of Patent: Aug. 26, 2025

(54) BRIGHTNESS ADJUSTMENT SYSTEM AND METHOD

(71) Applicant: HTC Corporation, Taoyuan (TW)

(72) Inventor: Yu-Tzu Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 190 days.

(21) Appl. No.: 18/447,329

(22) Filed: Aug. 10, 2023

(65) Prior Publication Data

US 2025/0056124 A1    Feb. 13, 2025

(51) Int. Cl.
*H04N 23/72* (2023.01)
*H04N 23/60* (2023.01)
*H04N 23/71* (2023.01)
*H04N 23/73* (2023.01)

(52) U.S. Cl.
CPC ............. *H04N 23/72* (2023.01); *H04N 23/73* (2023.01)

(58) Field of Classification Search
CPC ........ H04N 23/72; H04N 23/73; H04N 23/71; H04N 23/76
See application file for complete search history.

(56) References Cited

U.S. PATENT DOCUMENTS

| 10,051,191 | B1* | 8/2018 | Kurien ............... H04N 23/6815 |
| 11,671,714 | B1 | 6/2023 | Xiao et al. |
| 2005/0024500 | A1* | 2/2005 | Katayama ............. H04N 23/54 348/207.99 |

FOREIGN PATENT DOCUMENTS

| CN | 101346987 | 1/2009 |
| CN | 116132779 | 5/2023 |
| CN | 116438804 | 7/2023 |

OTHER PUBLICATIONS

"Office Action of Taiwan Counterpart Application", issued on Feb. 1, 2024, p. 1-p. 9.

* cited by examiner

*Primary Examiner* — Ahmed A Berhan
(74) *Attorney, Agent, or Firm* — JCIPRNET

(57) ABSTRACT

A brightness adjustment system is provided. The brightness adjustment system includes a camera, a direction sensor, and a processor. The camera is configured to obtain an image based on an exposure setting and gain. The direction sensor is configured to obtain sensor data. The processor is configured to determine a current direction which the camera is facing based on the sensor data and adjust the exposure setting of the camera or the gain based on the current direction.

18 Claims, 5 Drawing Sheets

BRIGHTNESS ADJUSTMENT SYSTEM AND METHOD

BACKGROUND

Technical Field

The disclosure relates to a brightness adjustment system; particularly, the disclosure relates to a brightness adjustment system and a brightness adjustment method.

Description of Related Art

Cameras have brought convenience to our lives in many ways. For example, by using a camera, a user may be able us to capture memories, share experiences, and document important events. Moreover, the camera may be used in a variety of industries, such as security, surveillance, journalism, and entertainment. Overall, the camera is a convenient and versatile tool that can be used to improve our lives in many ways.

SUMMARY

The disclosure is direct to a brightness adjustment system and a brightness adjustment method, so as to improve the user experience.

In this disclosure, a brightness adjustment system is provided. The brightness adjustment system includes a camera, a direction sensor, and a processor. The camera is configured to obtain an image based on an exposure setting and a gain. The direction sensor is configured to obtain sensor data. The processor is configured to determine a current direction which the camera is facing based on the sensor data and adjust the exposure setting or the gain of the camera based on the current direction.

In this disclosure, a brightness adjustment method is provided. The brightness adjustment method includes following steps: obtaining sensor data by a direction sensor; determining a current direction which a camera is facing based on the sensor data; adjusting an exposure setting or a gain of the camera based on the current direction; and obtaining an image based on the exposure setting and the gain.

Based on the above, according to the brightness adjustment system and the brightness adjustment method, the exposure setting and/or the gain of the camera is adjusted before capturing an image based on the sensor data, thereby increasing the user experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
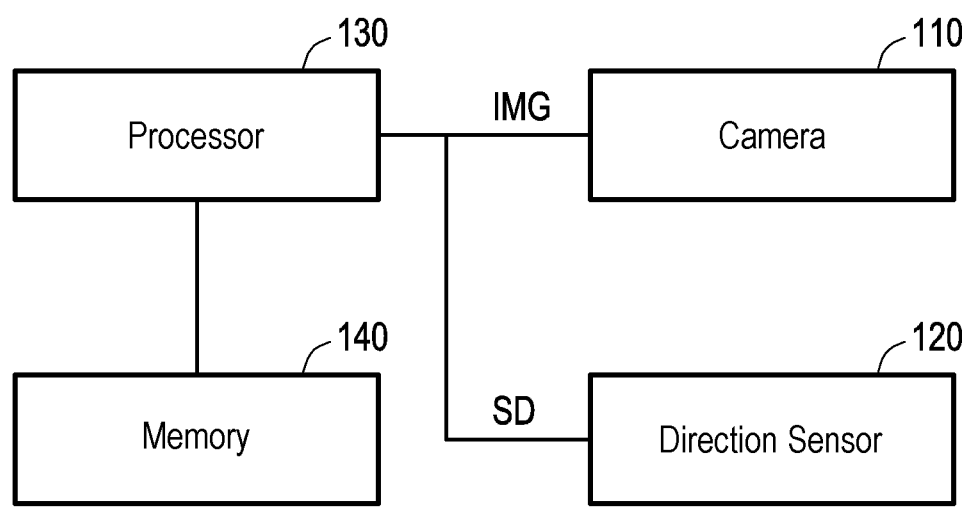
FIG. 1 is a schematic diagram of a brightness adjustment system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

Cameras have brought convenience to our lives in many ways. For example, by using a camera, a user may be able us to capture memories, share experiences, and document important events. Moreover, the camera may be used in a variety of industries, such as security, surveillance, journalism, and entertainment. Overall, the camera is a convenient and versatile tool that can be used to improve our lives in many ways.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, a camera may be used to provide visual content to a user.

While the camera is used as a visual source, the camera is usually configured to capture images frame by frame. After a current frame of an image is capture, the content of the captured image may be checked to determine whether the captured image is a good image or not. For example, a luminance value of the captured image may be too high, so that part of the captured image is overexposed. That is, after the content of the captured image being checked, the captured image may be not determined as a good image. For the purpose of capturing a good image, an exposure setting of the camera may be adjusted, so that the next frame of image may be determined as a good image. However, since the adjustment is done after at least one frame (e.g., the current frame) of image being captured, the bad image (i.e., the captured photo) being not determined as a good image user may already affect the user experience. Therefore, it is the pursuit of people skilled in the art to provide a solution to prevent bad images from happening.

FIG. 1 is a schematic diagram of a brightness adjustment system according to an embodiment of the disclosure. With reference to FIG. 1, a brightness adjustment system 100 may include a camera 110, a direction sensor 120, and a processor 130. The camera 110 may be configured to obtain an image IMG based on an exposure setting and a gain. The direction sensor 120 may be configured to obtain sensor data SD. The processor 130 may be configured to determine a current direction which the camera 110 is facing based on the sensor data SD. Moreover, the processor 130 may be configured to adjust the exposure setting or the gain of the camera 110 based on the current direction. In this manner, the exposure setting of the camera 110 may be adjusted before capturing an image IMG based on the sensor data SD and/or the gain of the camera may be adjusted before outputting the image IMG based on the sensor data SD, thereby increasing the user experience.

It is noted that, the exposure setting may be configured to adjust a size of an aperture, a time of a shutter, and an ISO (International Organization for Standardization) value of the camera 110, but this disclosure is not limited thereto. The exposure setting may include an exposure value (EV) and the exposure value may include the size of an aperture, a shutter time of a shutter, and an ISO value of the camera 110, but this disclosure is not limited thereto. In one embodiment, while the exposure value is decreased, a light capture ability of the camera 110 may be decreased to decrease a luminance value of the image IMG. That is, less light may be being let into the camera 110. In other words, the size of the aperture may be reduced (i.e., increasing the f-number), the time of the shutter time of the shutter may be shortened, and/or the value of the ISO value may be lower. On the other hand, while the exposure value is increased, the light capture ability of the camera 110 may be increased to increase the luminance value of the image IMG. That is, more light may be being let into the camera 110. In other words, the size of the aperture (i.e., decreasing the f-number) may be enlarged, the time of the shutter time of the shutter may be lengthened, and/or the value of the ISO value may be higher. However, this disclosure is not limited thereto.

In addition, instead of adjusting a hardware setting (i.e., the exposure setting) of the camera 110, a software setting may be adjusted. To be more specific, while the ISO value is to adjust sensitivity to light of a sensor of the camera 110 before the image IMG being captured, a gain is to control an amplification of a signal from the sensor of the camera 110 after the image IMG being captured. That is, the gain may be used to increase the brightness (i.e., luminance value) of the image IMG. For example, after the image IMG is captured, while the luminance value of the image IMG is too low, a higher gain may apply to the image IMG to output a properly exposed image as a new image IMG (also known as an amplified image). On the other hand, while the luminance value of the image IMG is too high, a lower gain may apply to the image IMG to output a properly exposed image as a new image IMG (also known as the amplified image). While the gain is zero, no amplification may be applied to the image IMG. In other words, the camera 110 may be configured to obtain the image IMG not only based on the exposure setting but also based on the gain.

In one embodiment, the camera 110 may include an auto exposure (AE) function. The AE function may be a function that automatically adjusts exposure setting to ensure that the next frame of the image IMG (i.e., an image to-be-captured) is properly exposed. The AE function typically works by following steps: measuring a brightness distribution (e.g., the luminance value) of a current frame of the image IMG (i.e., the captured image) and adjusting the exposure setting. After the exposure setting is adjusted by the AE, the camera 110 may be ready to capture the next frame of the image IMG. However, although the next frame of the image IMG may be correctly exposed because of the AE function, the current frame of the image IMG may be already overexposed or underexposed. That is, the user may not be able to obtain the information that the user want to know through the current frame of the image IMG. By detecting a current direction of the camera 110 through the direction sensor 120, the processor 130 may know that the camera 110 may be changing direction, thereby adjusting the exposure setting and/or the gain early on and/or preventing the incorrect exposure of the current frame of the image IMG from happening.

In one embodiment, the camera 110 may include, for example, a complementary metal oxide semiconductor (CMOS) camera, a charge coupled device (CCD) camera, a light detection and ranging (LiDAR) device, a radar, an infrared sensor, an ultrasonic sensor, other similar devices, or a combination of these devices. However, this disclosure is not limited thereto.

In one embodiment, the direction sensor 120 may include, for example, a gyroscope, an accelerometer, other similar devices, or a combination of these devices. This disclosure is not limited thereto. In one embodiment, the direction sensor 120 is a gyroscope and the sensor data SD includes three angular velocities in three degrees of freedom (DOF). The three angular velocities may include a roll angular velocity about an X axis, a pitch angular velocity about a Y axis, and a yaw angular velocity about a Z axis. In one embodiment, the direction sensor 120 is an accelerometer and the sensor data SD includes three linear acceleration values in three degrees of freedom. The three linear acceleration values may include a first acceleration value along the X axis, a second acceleration value along the Y axis, and a third acceleration value along the Z axis. In one embodiment, the direction sensor 120 comprises a gyroscope and an accelerometer and the sensor data SD includes changes in six degrees of freedom and the changes in the six degrees of freedom includes the three angular velocities corresponding to three perpendicular axes (e.g., X, Y, Z axes) and the three linear acceleration values corresponding to the three perpendicular axes. However, this disclosure is not limited thereto.

In one embodiment, the processor 130 may include, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 130 may be achieved as multiple program codes. The program codes are stored in a memory (e.g., the memory 140 in FIG. 1), and executed by the processor 130. Alternatively, in an embodiment, each of the functions of the processor 130 may be achieved as one or more circuits. The disclosure does not limit the use of software or hardware to achieve the functions of the processor 130.

In some embodiments, the brightness adjustment system 100 may further include a memory 140. The memory 140 may be configured to store the image IMG and/or the sensor data SD. Moreover, the memory 140 may be configured to store the exposure setting of the camera 110. However, this disclosure is not limited thereto. In one embodiment, the memory 140 may include, for example, NAND flash memory cores, NOR flash memory cores, static random access memory (SRAM) cores, dynamic random access memory (DRAM) cores, magnetoresistive random access memory (MRAM) cores, Phase change memory (PCM) cores, resistive random access memory (ReRAM) cores, 3D XPoint memory cores, ferroelectric random-access memory (FeRAM) cores, and other types of memory cores that are suitable for storing data. However, this disclosure is not limited thereto.

In one embodiment, the brightness adjustment system 100 may be included in a head-mounted display (HMD), wearable glasses (e.g., AR/VR goggles), a tablet, a smartphone, a projector, a laptop, other similar devices adapted for Extended Reality (XR) or other reality related technologies, or a combination of these devices. In another embodiment, the brightness adjustment system 100 may be included in an accessory device, such as a wrist band, a glove, a gauntlet, socks, shoes, or other similar accessories. However, this disclosure is not limited thereto.

In one embodiment, each of the components of the brightness adjustment system 100 may be directly or indirectly coupled to or communicate with each other. In one embodiment, each of the camera 110, the direction sensor 120, the processor 130, and the memory 140 may include or be coupled to a network module. The network module may include, for example, a wired network module, a wireless network module, a Bluetooth module, an infrared module, a radio frequency identification (RFID) module, a Zigbee network module, or a near field communication (NFC) network module, but the disclosure is not limited thereto. That is, each of the components of the brightness adjustment system 100 may be configured to communicate with each other through either wired communication or wireless communication.

Figure 2:
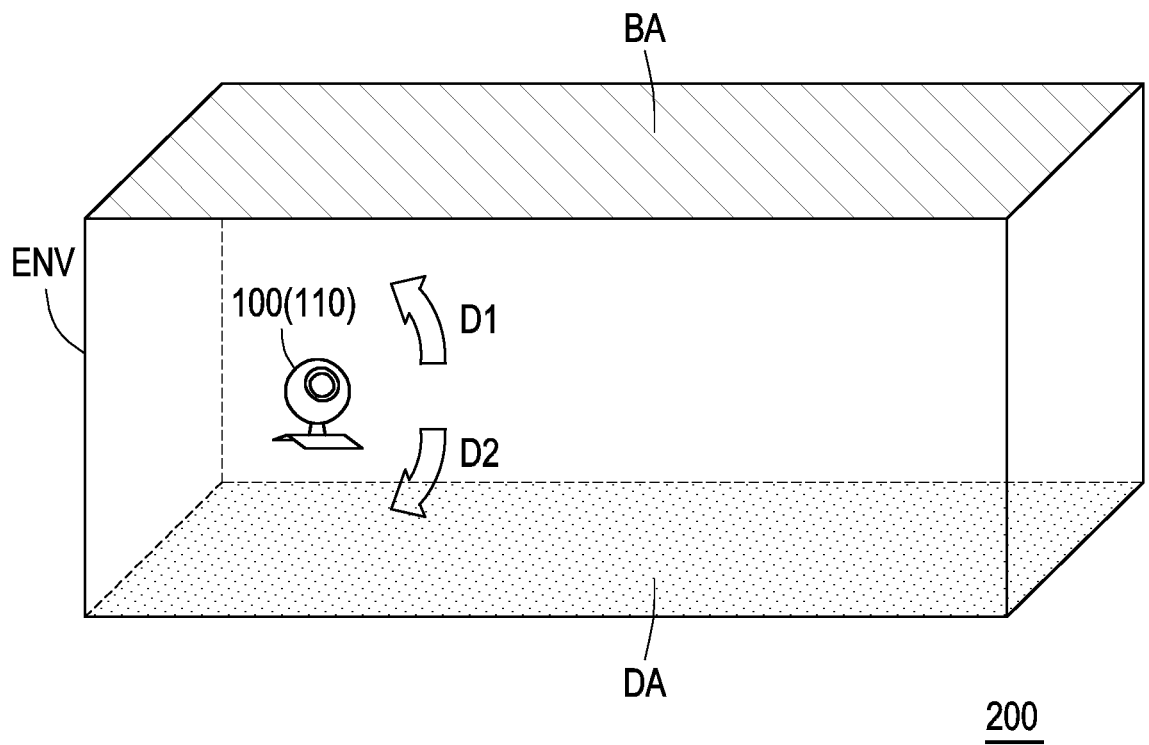
FIG. 2 is a schematic diagram of a brightness adjustment scenario according to an embodiment of the disclosure.

FIG. 2 is a schematic diagram of a brightness adjustment scenario according to an embodiment of the disclosure. With reference to FIG. 1 to FIG. 2, a brightness adjustment scenario 200 depicts how the exposure setting and/or the gain of the camera 110 of the brightness adjustment system 100 is adjusted. It is noted that, while for the sake of convenience in explanation that only the camera 110 is depicted to represent the brightness adjustment system 100 in the brightness adjustment scenario 200, but this disclosure is not limited thereto.

In one embodiment, the brightness adjustment system 100 may be disposed in an environment ENV. The environment ENV may include a bright area BA and a dark area DA. In one embodiment, the environment ENV may be a room and the bright area BA may be a light on the ceiling of the room. On the other hand, the dark area DA may be a dark carpet on the floor of the room. However, this disclosure is not limited thereto. For example, in another embodiment, the bright area BA may include, for example, a window, a mirror reflecting a light source, a white paper, a pile of snow, other similar object, or a combination of these objects. That is, the bright area BA may be an area or an object in the environment ENV and a luminance value of the bright area BA may be higher than an average luminance value of the environment ENV. Similarly, the dark area DA may include, for example, a cave, a shadow, a black paper, other similar object, or a combination of these objects. That is, the dark area DA may be an area or an object in the environment ENV and a luminance value of the dark area DA may be lower than an average luminance value of the environment ENV. Moreover, the number of the bright area BA and/or the number of the dark area DA may be more than one and this disclosure does not limited the number of the bright area BA and/or the number of the dark area DA.

By detecting a current direction of the camera 110 through the direction sensor 120, the processor 130 may know that the camera 110 may be changing direction, thereby adjusting the exposure setting and/or the gain early on and/or preventing the incorrect exposure of the current frame of the image IMG from happening. For example, while the camera 110 changes the current direction towards a first direction D1, the processor 130 may know that the camera 110 may be about to face the bright area BA. It is noted that, typically, since the luminaries are mounted on the ceiling, the first direction D1 may be an upward direction. That is, the processor 130 may be configured to: in response to the current direction of the camera 110 being an upward direction, decrease an exposure value of the exposure setting and/or the gain of the camera 110. On the other hand, while the camera 110 changes the current direction towards second direction D2, the processor 130 may know that the camera 110 may be about to face the dark area DA. Similarly, since a brightness of the floor is usually darker than a brightness of the ceiling, the second direction D2 may be a downward direction. That is, the processor 130 may be configured to: in response to the current direction of the camera 110 being a downward direction, increase an exposure value of the exposure setting and/or the gain of the camera 110. In this manner, the exposure setting and/or the gain of the camera 110 may be adjusted before capturing an image IMG based on the sensor data SD, thereby preventing bad images from happening.

Figure 3A:
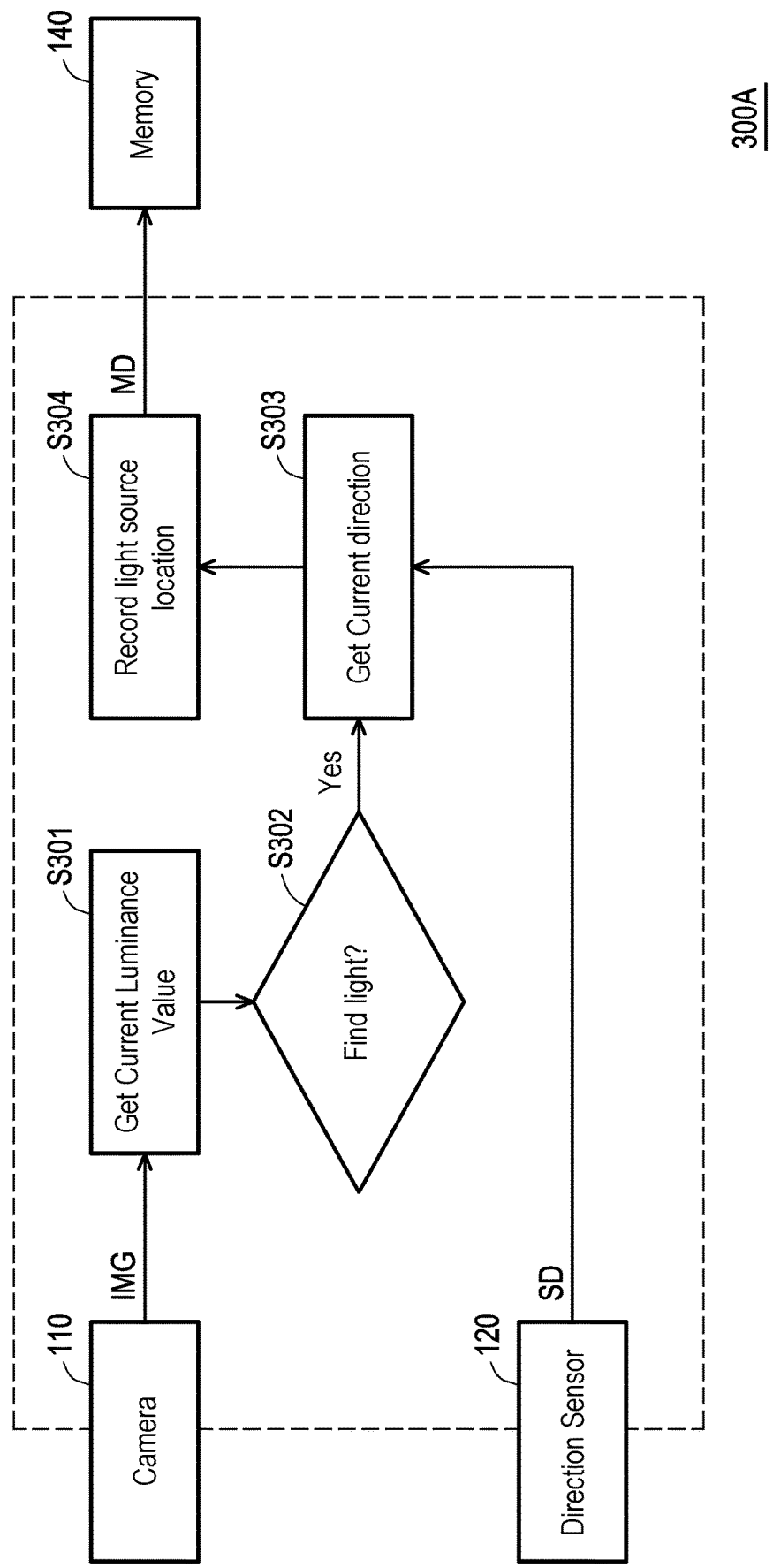
FIG. 3A is a schematic diagram of a software structure of a brightness adjustment system according to an embodiment of the disclosure.

FIG. 3A is a schematic diagram of a software structure of a brightness adjustment system according to an embodiment of the disclosure. With reference to FIG. 1 to FIG. 3A, a software structure 300A of the brightness adjustment system 100 depicts how the brightness adjustment system 100 builds map data MD of the environment ENV around the user. The map data MD may include the luminance values of all the objects or areas in the environment ENV. That is, the map data MD may include information that where the bright area BA is and/or where the dark area DA is. In one embodiment, the map data MD may include a bright direction of the bright area BA and a dark direction of the dark area DA, but this disclosure is not limited thereto. Further, a memory 140 of the brightness adjustment system 100 may be configured to store the map data MD. Therefore, the processor 130 may be configured to adjust the exposure setting and/or the gain of the camera 110 based on the current direction and the map data MD.

As shown in FIG. 3A, the camera 110 may be configured to provide a current frame of the image IMG and the direction sensor 120 may be configured to provide the sensor data SD. In a step S301, the processor 130 may be configured to get a current luminance value of the current frame of the image IMG by calculating an average value of a brightness distribution of the current frame of the image IMG. In a step S302, in one embodiment, when the camera 110 is changing direction, if the current luminance value of the current frame of the image IMG suddenly increases a considerable percentage (i.e., becomes relatively high), it may mean that there may be a light source (i.e. the bright area BA) in this direction. In another embodiment, when the camera 110 is changing direction, if the current luminance value of the current frame of the image IMG suddenly being higher than a predetermined value, it may mean that there may be a light source (i.e. the bright area BA) in this direction. However, this disclosure is not limited thereto. In addition, instead of finding a light source (i.e. the bright area BA), the step S302 may be also used to find a dark area DA. The implementation details of finding the dark area DA may be referred to the descriptions of finding the bright area BA to obtain sufficient teachings, suggestions, and implementation embodiments, while the details are not redundantly described seriatim herein.

In a step S303, the processor 130 may be configured to get a current direction of the camera 110 based on the sensor data SD from the direction sensor 120. That is, in response to the camera 110 being changing the current direction and a current luminance value of a current frame of the image IMG being a predetermined percentage larger than a previous luminance value of a previous frame of the image IMG, determine the current direction as a bright direction of the bright area BA. Similarly, in response to the camera 110 being changing the current direction and a current luminance value of a current frame of the image IMG being a predetermined percentage smaller than a previous luminance value of a previous frame of the image IMG, determine the current direction as a dark direction of the dark area DA. In a step S304, the processor 130 may be configured to provide the bright direction of the bright area BA (or the dark direction of the dark area DA) to the memory 140 to store the bright direction (or the dark direction) in the map data MD. The step S301 to the step S304 may be performed by the processor 130 repetitively until all the luminance values of the environment ENV being recorded in the map data MD in the memory 140. By utilizing the map data MD, the exposure setting and/or the gain of the camera 110 may be adjusted early on, thereby preventing the incorrect exposure of the current frame of the image IMG from happening.

Figure 3B:
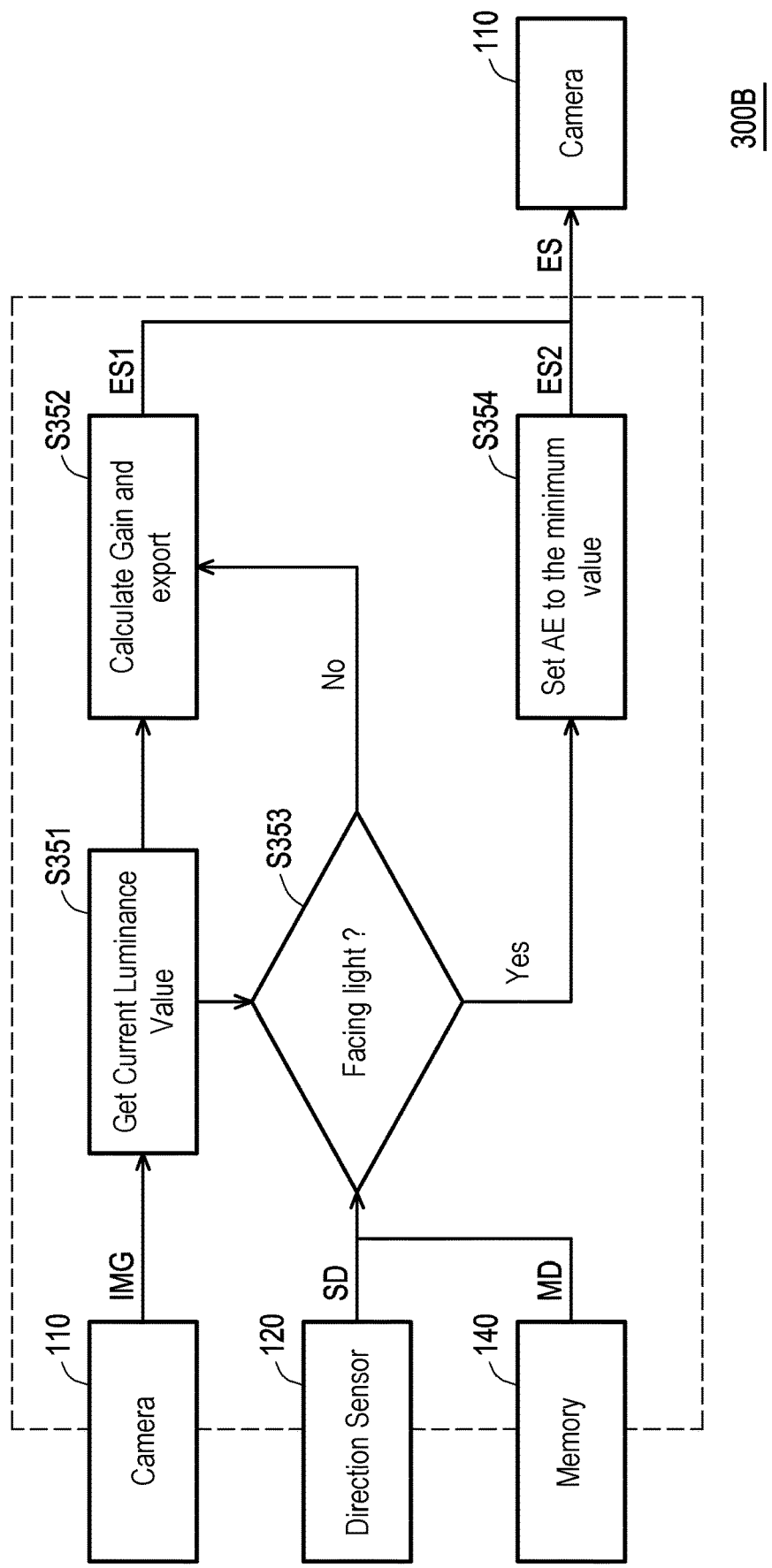
FIG. 3B is a schematic diagram of a software structure of a brightness adjustment system according to an embodiment of the disclosure.

FIG. 3B is a schematic diagram of a software structure of a brightness adjustment system according to an embodiment of the disclosure. With reference to FIG. 1 to FIG. 3B, a software structure 300B of the brightness adjustment system 100 depicts how the brightness adjustment system 100 utilizes the AE function and the map data MD to adjust the exposure setting of the camera 110.

As shown in FIG. 3B, the camera 110 may be configured to provide a current frame of the image IMG, the direction sensor 120 may be configured to provide the sensor data SD, and the memory 140 may be configured provided the map data MD. In a step S351, the processor 130 may be configured to get a current luminance value of the current frame of the image IMG by calculating an average value of a brightness distribution of the current frame of the image IMG. In a step S352, the processor 130 may be configured to calculate a gain for a next frame of the image IMG based on the AE function to generate the next frame of the image IMG. Further, the processor 130 may be configured to generate a first exposure setting ES1 based on the gain and export the first exposure setting ES1. That is, the first exposure setting ES1 may be determined based on the AE function.

In a step S353, the processor 130 may be configured to get a current direction of the camera 110 based on the sensor data SD from the direction sensor 120. Further, the processor 130 may be configured to determine whether the current direction is going to (about to) face the bright area BA based on the map data MD. That is, the processor 130 may be configured to determine a difference (e.g., angle or distance) between the current direction of the camera 110 and the bright direction of the bright area BA. While the difference between the current direction of the camera 110 and the bright direction of the bright area BA is smaller than a predetermine threshold value and the difference is still decreasing, the processor 130 may be configured to determine that the camera 110 is facing or going to face the bright area BA (e.g., a light).

In a step S354, while the camera 110 being facing or going to face the bright area BA is determined, the processor 130 may be configured to adjust the exposure setting of the camera 110 to a second exposure setting ES2 to prevent the next frame of the image IMG being overexposed. That is, in response to the difference being smaller than a predetermine threshold value and the difference being decreasing, the processor 130 may be configured to decrease an exposure value of the exposure setting of the camera 110. For example, the exposure value may be set to the minimum value of the camera 110, but this disclosure is not limited thereto. Similarly, regarding the dark area DA, in response to the difference being smaller than a predetermine threshold value and the difference being decreasing, the processor 130 may be configured to increase an exposure value of the exposure setting of the camera 110. For example, the exposure value may be set to the maximum value of the camera 110, but this disclosure is not limited thereto. In addition, the processor 130 may be configured export the second exposure setting ES2. That is, the second exposure setting ES2 may be determined based on the sensor data SD and the map data MD.

It is noted that, while both of the first exposure setting ES1 and the second exposure setting ES2 are generated, the camera 110 may be configured to obtain a next frame of image IMG based on only the second exposure setting ES2. Further, in one embodiment, while the camera 110 being facing or going to face the bright area BA (or the dark area DA) is determined, the first exposure setting ES1 might not be exported from the processor 130 to the camera 110. However, this disclosure is not limited thereto. In this manner, the exposure setting of the camera 110 is adjusted before capturing an image IMG based on the sensor data SD and the map data MD, thereby increasing the user experience.

Figure 4:
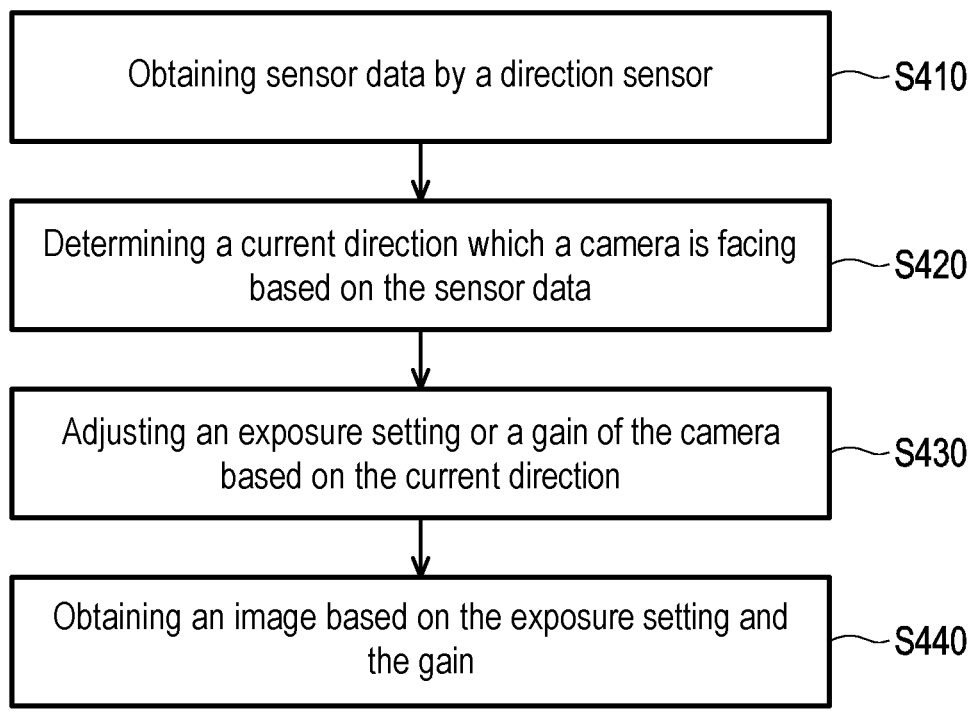
FIG. 4 is a schematic flowchart of a brightness adjustment method according to an embodiment of the disclosure.

FIG. 4 is a schematic flowchart of a brightness adjustment method according to an embodiment of the disclosure. With reference to FIG. 1 to FIG. 4, a brightness adjustment method 400 may include a step S410, a step S420, a step S430, and a step S440.

In the step S410, the sensor data SD may be obtained by the direction sensor 120. In the step S420, the current direction which the camera 110 is facing may be determined by the processor 130 based on the sensor data SD. In the step S430, the exposure setting and/or the gain of the camera 110 may be adjusted by the processor based on the current direction of the camera 110. In the step S440, an image IMG may be obtained by the camera 110 based on the exposure setting and the gain. In addition, the implementation details of the brightness adjustment method 400 may be referred to the descriptions of FIG. 1 to FIG. 4 to obtain sufficient teachings, suggestions, and implementation embodiments, while the details are not redundantly described seriatim herein.

In this manner, the exposure setting and/or the gain of the camera 110 is adjusted before capturing an image IMG based on the sensor data SD and the map data MD, thereby increasing the user experience.

In summary, according to the brightness adjustment system 100 and the brightness adjustment method 400, by detecting a current direction of the camera 110 through the direction sensor 120, the processor 130 may know that the camera 110 may be changing direction, thereby adjusting the exposure setting and/or the gain early on and/or preventing the incorrect exposure of the current frame of the image IMG from happening. Therefore, the user experience is improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A brightness adjustment system, comprising:
   a camera, configured to obtain an image based on an exposure setting and a gain;
   a direction sensor, configured to obtain sensor data;
   a memory, configured to store map data of an environment around a user; and
   a processor, configured to:
      determine a current direction which the camera is facing based on the sensor data and adjust the exposure setting or the gain of the camera based on the current direction and the map data.

2. The brightness adjustment system according to claim 1, wherein the processor is further configured to: in response to the current direction being an upward direction, decrease an exposure value of the exposure setting or decrease the gain.

3. The brightness adjustment system according to claim 1, wherein the processor is further configured to: in response to the current direction being a downward direction, increase an exposure value of the exposure setting or increase the gain.

4. The brightness adjustment system according to claim 1, wherein
   the map data comprises a bright direction of a bright area in the environment, wherein a luminance value of the bright area is higher than an average luminance value of the environment, and
   the processor is further configured to:
      in response to the camera being changing the current direction and a current luminance value of a current frame of the image being a predetermined percentage larger than a previous luminance value of a previous frame of the image, determine the current direction as the bright direction of the bright area and store the bright direction in the map data.

5. The brightness adjustment system according to claim 1, wherein
   the map data comprises a bright direction of a bright area in the environment, wherein a luminance value of the bright area is higher than an average luminance value of the environment, and
   the processor is further configured to:
      in response to a difference between the current direction and the bright direction being smaller than a predetermine threshold value and the difference being decreasing, decrease an exposure value of the exposure setting or decrease the gain.

6. The brightness adjustment system according to claim 5, wherein the processor is further configured to:
   in response to the difference being smaller than the predetermine threshold value and the difference being decreasing, set the exposure value or the gain to a minimum value.

7. The brightness adjustment system according to claim 1, wherein
   the map data comprises a dark direction of a dark area in the environment, wherein a luminance value of the dark area is lower than an average luminance value of the environment, and
   the processor is further configured to:
      in response to the camera being changing the current direction and a current luminance value of a current frame of the image being a predetermined percentage smaller than a previous luminance value of a previous frame of the image, determine the current direction as the dark direction of the dark area and store the dark direction in the map data.

8. The brightness adjustment system according to claim 1, wherein
   the map data comprises a dark direction of a dark area in the environment, wherein a luminance value of the dark area is lower than an average luminance value of the environment, and
   the processor is further configured to:
      in response to a difference between the current direction and the dark direction being smaller than a predetermine threshold value and the difference being decreasing, increase an exposure value of the exposure setting or increase the gain.

9. The brightness adjustment system according to claim 8, wherein the processor is further configured to:
   in response to the difference being smaller than the predetermine threshold value and the difference being decreasing, set the exposure value or the gain to a maximum value.

10. A brightness adjustment method, comprising:
    obtaining sensor data by a direction sensor;
    storing map data of an environment around a user;
    determining a current direction which a camera is facing based on the sensor data;
    adjusting an exposure setting or a gain of the camera based on the current direction and the map data; and
    obtaining an image based on the exposure setting and the gain.

11. The brightness adjustment method according to claim 10, further comprising:
    in response to the current direction being an upward direction, decreasing an exposure value of the exposure setting or decreasing the gain.

12. The brightness adjustment method according to claim 10, further comprising:
   in response to the current direction being a downward direction, increasing an exposure value of the exposure setting or increasing the gain.

13. The brightness adjustment method according to claim 10, wherein
   the map data comprises a bright direction of a bright area in the environment, wherein a luminance value of the bright area is higher than an average luminance value of the environment, and
   the brightness adjustment method further comprises:
      in response to the camera being changing the current direction and a current luminance value of a current frame of the image being a predetermined percentage larger than a previous luminance value of a previous frame of the image, determining the current direction as the bright direction of the bright area and store the bright direction in the map data.

14. The brightness adjustment method according to claim 10, wherein
   the map data comprises a bright direction of a bright area in the environment, wherein a luminance value of the bright area is higher than an average luminance value of the environment, and
   the brightness adjustment method further comprises:
      in response to a difference between the current direction and the bright direction being smaller than a predetermine threshold value and the difference being decreasing, decreasing an exposure value of the exposure setting or decreasing the gain.

15. The brightness adjustment method according to claim 14, further comprising:
   in response to the difference being smaller than the predetermine threshold value and the difference being decreasing, setting the exposure value or the gain to a minimum value.

16. The brightness adjustment method according to claim 10, wherein
   the map data comprises a dark direction of a dark area in the environment, wherein a luminance value of the dark area is lower than an average luminance value of the environment, and
   the brightness adjustment method further comprises:
      in response to the camera being changing the current direction and a current luminance value of a current frame of the image being a predetermined percentage smaller than a previous luminance value of a previous frame of the image, determining the current direction as the dark direction of the dark area and store the dark direction in the map data.

17. The brightness adjustment method according to claim 10, wherein
   the map data comprises a dark direction of a dark area in the environment, wherein a luminance value of the dark area is lower than an average luminance value of the environment, and
   the brightness adjustment method further comprises:
      in response to a difference between the current direction and the dark direction being smaller than a predetermine threshold value and the difference being decreasing, increasing an exposure value of the exposure setting or increasing the gain.

18. The brightness adjustment method according to claim 17, further comprising:
   in response to the difference being smaller than the predetermine threshold value and the difference being decreasing, setting the exposure value or the gain to a maximum value.

* * * * *